United States Patent

Hummel, III (12) United States Patent
(10) Patent No.: US 8,734,157 B1
(45) Date of Patent: May 27, 2014

(54) EXERCISE AND GAMING APPARATUS (76) Inventor: Julius Andrew Hummel, III, Rogers, AR (US)

(*) Notice: Subject to any disclaimer, the term of this patent is extended or adjusted under 35 U.S.C. 154(b) by 42 days.

(21) Appl. No.: 13/294,030

(22) Filed: Nov. 10, 2011

Related U.S. Application Data (60) Provisional application No. 61/412,777, filed on Nov. 11, 2010.

(51) Int. Cl.
*A63F 13/00* (2006.01)
*A63B 24/00* (2006.01)

(52) U.S. Cl.
CPC *A63F 13/00* (2013.01); *A63B 24/00* (2013.01)
USPC ............................................ 434/55; 434/247

(58) Field of Classification Search
CPC .......... A63F 13/00; A63B 24/00; G06F 19/00
USPC ........... 463/6; 434/43, 33, 59, 55, 247; 703/8; 482/23; 472/118; 104/113
See application file for complete search history.

(56) References Cited

U.S. PATENT DOCUMENTS

| | | | | |
|---|---|---|---|---|
| 3,026,816 | A * | 3/1962 | Russo et al. | 104/113 |
| 5,050,865 | A * | 9/1991 | Augspurger et al. | 482/2 |
| 5,584,696 | A * | 12/1996 | Walker et al. | 434/43 |
| 5,584,700 | A * | 12/1996 | Feldman et al. | 434/247 |
| 5,662,555 | A * | 9/1997 | Cloutier | 482/23 |
| 5,785,630 | A * | 7/1998 | Bobick et al. | 482/4 |
| 6,042,382 | A * | 3/2000 | Halfhill | 434/59 |
| 6,283,757 | B1 * | 9/2001 | Meghnot et al. | 434/33 |
| 6,695,694 | B2 | 2/2004 | Ishikawa et al. | |
| 7,699,755 | B2 | 4/2010 | Feldman et al. | |
| 7,927,253 | B2 | 4/2011 | Vincent et al. | |
| 2005/0049055 | A1 * | 3/2005 | Publicover et al. | 472/118 |
| 2007/0111858 | A1 | 5/2007 | Dugan | |
| 2007/0123390 | A1 | 5/2007 | Mathis | |
| 2007/0254778 | A1 | 11/2007 | Ashby | |
| 2007/0260438 | A1 * | 11/2007 | Langer et al. | 703/8 |
| 2009/0209309 | A1 * | 8/2009 | Wu et al. | 463/6 |
| 2010/0266994 | A1 * | 10/2010 | Gregoire et al. | 434/55 |

* cited by examiner

*Primary Examiner* — Masud Ahmed
*Assistant Examiner* — Frank M Leiva
(74) *Attorney, Agent, or Firm* — Grant Johnson (57) ABSTRACT

An exercise and video game control apparatus comprising a carriage suspended from a frame by support cables; a first handle coupled to the support cables within arm-reach of the suspended carriage; and a first sensor that generates game related signals when the user biases the game chair away from the first handle. Some embodiments may further comprise a sway bar coupled to the game chair and a plurality of cables, wherein the sway bar reduces motion of the game chair when the user biases the game chair away from the first handle; a rocker coupled to a bottom surface of the frame; and a footpad coupled to the frame within leg-reach of the game chair, the footpad adapted to rotates the frame from a neutral position along the rocker.

12 Claims, 11 Drawing Sheets

EXERCISE AND GAMING APPARATUS

CROSS REFERENCE TO RELATED APPLICATIONS

This patent claims the benefit of U.S. Provisional Application Ser. No. 61/412,777, filed Nov. 11, 2010, which is herein incorporated by reference in its entirety.

BACKGROUND

This invention generally relates to a combination video game controller and exercise machine. More specifically, the invention relates to a video game controller that provides resistance training and simulated movement.

Modern exercise equipment generally falls into two categories, machines focused on improving a user's cardiovascular fitness and machines focused on increasing strength. Some of the cardiovascular systems have included simple games. The games, however have been limited to the display of a virtual 'rabbit' that helps the user maintain their desired pace.

Game controllers have traditionally been handheld devices designed to be actuated using small movements of the user's thumbs and fingers. More modern designs, such as the Wii by Nintendo, allow the user to make large body movements that correspond to the action in the game. In both designs, however, there is little resistance behind these movements, and therefore, little exercise occurs.

SUMMARY

Embodiments of the present invention combine video game control and exercise, as well as create an enhanced video gaming experience. Some embodiments allow the user to push or pull on foot and hand holds. The pushing and pulling rolls and tilts the user in a way that corresponds to the action in the video game. The energy needed to power the simulation may be created by the user. Thus, unlike conventional simulators that use a complicated array of hydraulics to provide the roll and tilt motion, embodiments of the present invention rely on a simple apparatus powered with human strength. In addition, the game control movement also provides the user with exercise.

One aspect of the present invention is an exercise apparatus, comprising a carriage suspended from a frame by support cables; a first handle coupled to the support cables within arm-reach of the suspended carriage; and a first sensor that generates game related signals when the user biases the game chair away from the first handle. Some embodiments may further comprise a sway bar coupled to the game chair and a plurality of cables, wherein the sway bar reduces motion of the game chair when the user biases the game chair away from the first handle; a rocker coupled to a bottom surface of the frame; and a footpad coupled to the frame within leg-reach of the game chair, the footpad adapted to rotates the frame from a neutral position along the rocker.

Another aspect of the present invention is game controller for transmitting operation data to a computer executing a game program. One embodiment of this game controller comprises a first handle operatively coupled to a first sensor, wherein the sensor generates game related data in response to a user input on the first handle; and a game chair suspended from a frame, wherein the user input on the first handle biases the game chair from a neutral position relative to the frame, and wherein a response time of the first sensor to the user input is less than a response time of the game chair to the user input. Some embodiments may further comprise a footpad coupled to the frame, wherein user input on the footpad pitches the frame around a rocker surface; and a sway bar coupled to the first handle and the second handle by a cable, wherein the sway bar is adapted to reduce motion of the game chair in response to the user input on the first and second handles.

Another aspect of the present invention is a method of controlling a video game. One embodiment of this method comprises rolling a suspended video game chair away from a first handle, the first handle having an integrated sensor that generates first game related data in response the rolling; and pitching the suspended video game chair away from a foot rest, wherein the pitching rolls the handle generates second game related data in response to the pitching.

LIST OF NAMED ELEMENTS

100—Exercise and gaming apparatus
101—Rear upper support wire
105—Coupler
107*a*—Hand controller, left side
107*b*—Hand controller, right side
108—Front end of coupler
109—Rear end of coupler
110—Front upper support wire
115*a*—Left lower support wire
115*b*—Right lower support wire
120—Game chair
125—Carriage
127—Carriage frame
130—Video monitor
132—Game console
135—Upper stabilizing bar
140—U-joint pivot
142—Hinge pivot
144—Upper stabilizing bar brace
145—Rocker frame
150—Front rocker frame member
155—Upper rocker frame member
160—Rear rocker frame member
165—Bottom rocker frame member
170—Sway bar 174—Rocker track
175—Grove
180—Upper stabilizing bar brace
188—Stabilizing wire
205—Sway bar support
210—Lower sway bar support pivot
215—Upper sway bar support pivot
302n—Sway bar in neutral position
302b—Sway bar in biased position
320—Elevation Path of Sway bar Pivot
330—Elevation change
515—Footpad
545—Footpad to rocker band
550—Footpad to carriage connector
560—Foot straps

DETAILED DESCRIPTION

FIGS. 1-5b depict one embodiment 100 of a video game control and exercise apparatus. The embodiment 100 illustrated in these figures is desirable because it can be used with any sort of game, but may be particularly appropriate for video games that use a first person perspective and/or in video games that simulate motion (e.g., flying, boating, or driving games). Moreover, this embodiment 100 can replace a traditional hand held game controller in existing games, such as those written for the Sony Playstation or Microsoft XBox platforms, or be part of a custom platform with its own specialized software.

Unlike traditional controllers, which are held in the user's hands and operated using their fingers and thumbs, the embodiment 100 in FIGS. 1-5b allows the user to sit in the device; to control the game with large, resisted movements of their arms and legs; and to physically experience motion in multiple dimensions. Accordingly, in operation, the user sits in a game chair 120 during game play. The user's arms control left and right motion, while their legs control forward and backward motion. Moving the hand and feet controls adjusts the orientation of the chair 120, while simultaneously controlling simulated action the video game. That is, large scale motion of the user's arms and legs physically roll and tilt the user and move the user left or right, forward or backward. This real-world, three-dimensional movement is desirable because it corresponds with the simulated, in-game movement of the user's representation (i.e., avatar) in many video games. In addition, the user's physical exertion powers this movement and the user's own weight provides resistance to it. In this way, these embodiments combine to provide exercise and create a more compelling gaming experience. Some embodiments include additional buttons operated with the fingers and thumbs which control the firing of guns or other actions required by the game being played.

Overall Shape and Function

Figure 1A:
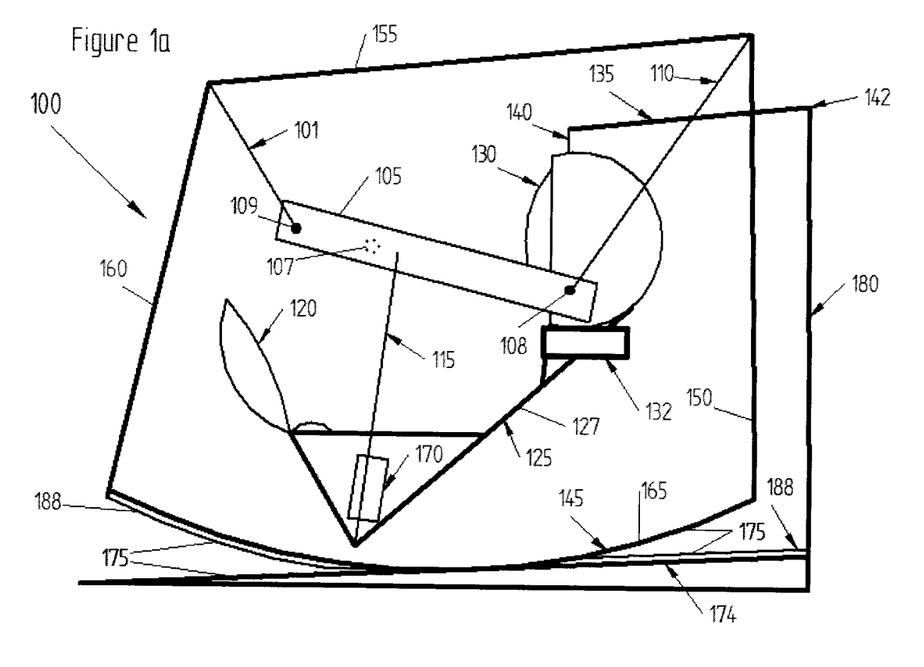
FIG. 1*a* is a partial side view of one embodiment of the present invention, with the support wires, footpads and the forward/reverse wires removed for clarity.
Figure 1B:
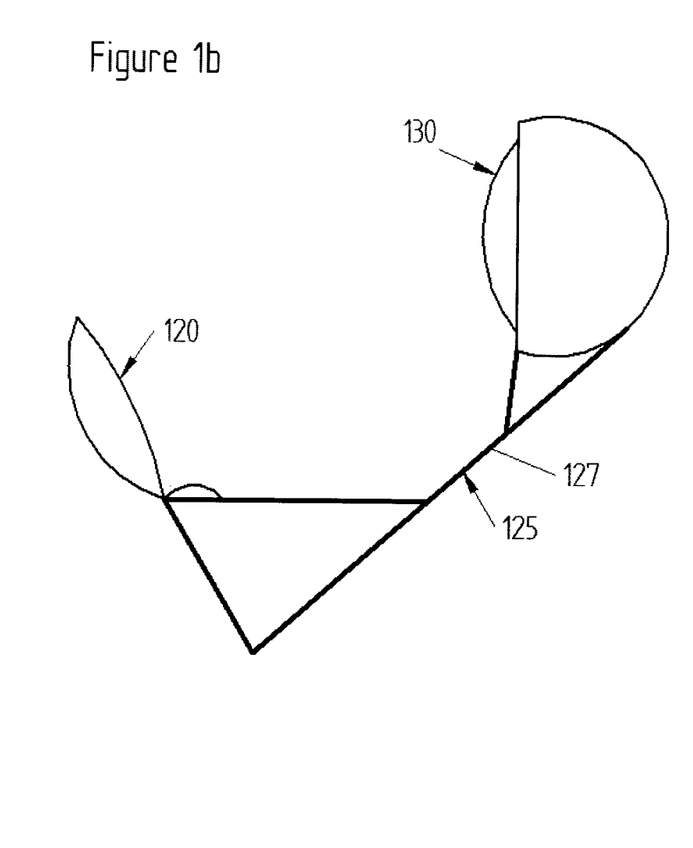
FIG. 1*b* is a detailed view of a carriage embodiment.

FIG. 1a shows a partial view of a right side of one video game controller and exercise apparatus embodiment 100, with the foot controls removed for clarity. This embodiment 100 includes a carriage 125 suspended from a rocker frame 145 by a front upper support wire 110, a rear upper support wire 101, a coupler 105, and a lower support wire 115. The carriage 125, in turn, comprises a game chair 120, a video monitor 130, and a game console 132, which are rigidly held together by a carriage frame 127. The game console 132 in this embodiment is operably connected to the video monitor 130 and a plurality of sensors (described in more detail with reference to FIGS. 4-5) by wires (not shown), infrared signals, wireless signals, or the like. FIG. 1a also shows an upper stabilizing bar 135 connected to an upper stabilizing bar brace 180 by a hinge pivot 142, and connected to the carriage 125 by a U-joint pivot 140.

Figure 1C:
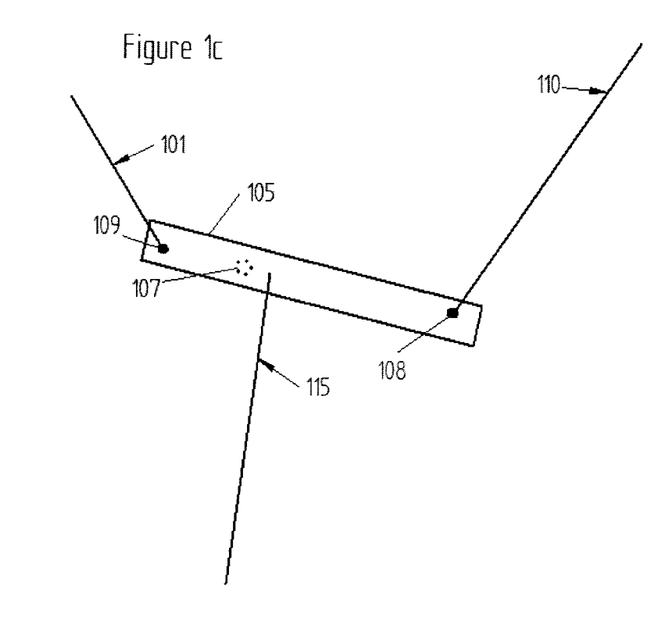
FIG. 1*c* is a detailed view of a coupler embodiment.
Figure 1D:
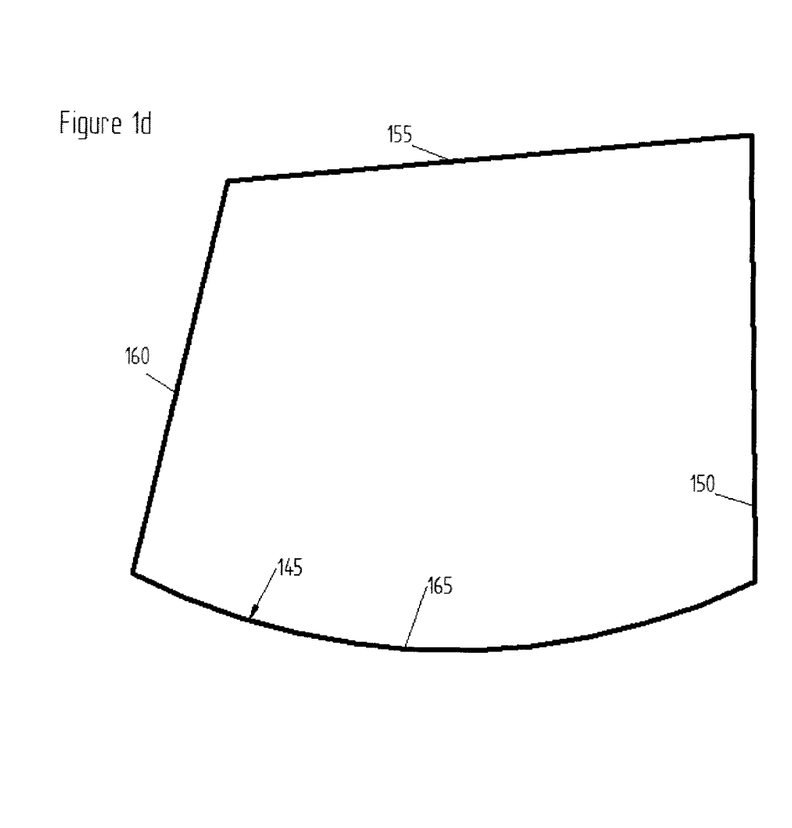
FIG. 1*d* is a detailed view of a rocker frame embodiment.

As best shown in FIGS. 1a and 1d, the rocker frame 145 in this embodiment 100 comprises twin front rocker frame members 150, twin rear rocker frame member 160, twin upper rocker frame members 155, and twin bottom rocker members 165 (only one of each frame member shown for clarity) that are rigidly attached together at their ends. The bottom rocker members 165 in this embodiment rest in and pivot along twin grooved rocker tracks 174. The grooves 175 in the rocker tracks 174 prevent the rocker frame 145 from siding to the user's left or right during vigorous game play. The rocker tracks 174 in this embodiment 100 are also inclined, for example, at a two-degree slope relative to level ground. In this way, gravity prevents the rockers 145 from sliding forward, up the slope, during use. The two stabilizing wires 188 in the grooves 175, each attached to the back edge of the bottom rocker frame member 165 and to either the upper stabilizing bar brace 144 or the top of the rocker track 174, similarly prevent the rocker frame 145 from sliding backward during use. In other embodiments, the rocker frame 145 could be attached to walls and/or floor by elastic bands to prevent undue sliding during game-play. In still other embodiments, the curved rocker bottoms 165 could be replaced by a swinging seat suspended from a fixed platform by a four-bar linkage, such at those used in gliding rocking chairs.

As best shown in FIGS. 1a and 1c, the front upper support wire 110 and rear upper support wire 101 are connected to opposite ends 108, 109 of the coupler 105. The lower support wire 115, in turn, is connected to the middle of the coupler 105. Two of these support assemblies, i.e., elements 101, 105, 110, 115, are present in this embodiment 100; one assembly on the user's left side of the carriage 125 and one assembly on the user's right side of the carriage 125. Each coupler 105 is connected to a grip-shaped hand controller 107 (described in more detail with reference to FIG. 4). Each of the two pairs of upper support wires 101 and 110 are attached to and held up by the rocker frame 145. The lower support wires 115 are connected to the bottom of the carriage 125 via a sway bar 170 (discussed in more detail with reference to FIG. 3).

Figure 1E:
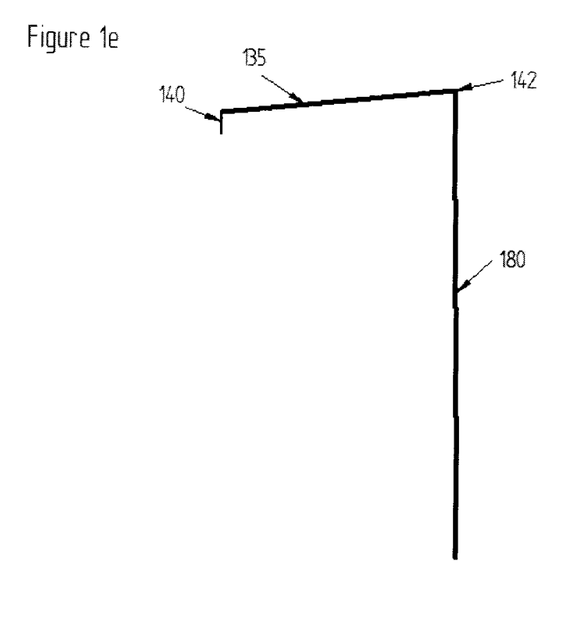
FIG. 1*e* is a detailed view of a connection between a carriage embodiment and a stabilizing bar brace.

FIGS. 1a and 1e show a view of the upper stabilizing bar 135. The upper stabilizing bar 135, the hinge pivot 142, and the u-joint pivot 140 combine to allow the carriage 125 to move up and down, tilt and turn relative to the upper stability bar brace 180, while preventing the top of the carriage 125 from move left, right, forward or backward relative to the bar brace 180. This feature is desirable because prevents the carriage 125, and thus the user, from falling over during game play.

Left and Right Motion

Left and right motion of the carriage 125 and the user's avatar in this embodiment 100 is generated and controlled by the user's arms. If the user wants their avatar to turn left, the user can pull down on the left hand controller 107a, push up on the right hand controller 107b, or both simultaneously. These actions will slide the chair 120 to the user's left, pivots the chair 120 in a clockwise direction about the z axis, and tilts the chair 120 to the right by moving the bottom of the chair 120 to the left at a greater rate than the top of the chair 120 around the U-joint pivot 140. Quicker, more forceful movement using both hands will produce a larger, faster turn, both of the chair 120 relative to the U-joint pivot 140 and of the user's avatar in-game. That is, if the user wants to make a slow left turn they will pull down slightly with the left arm or push up slightly with the right arm. If the user wants to make a fast left turn, the user will pull down harder with the left arm while pushing up with the right arm.

Figure 2A:
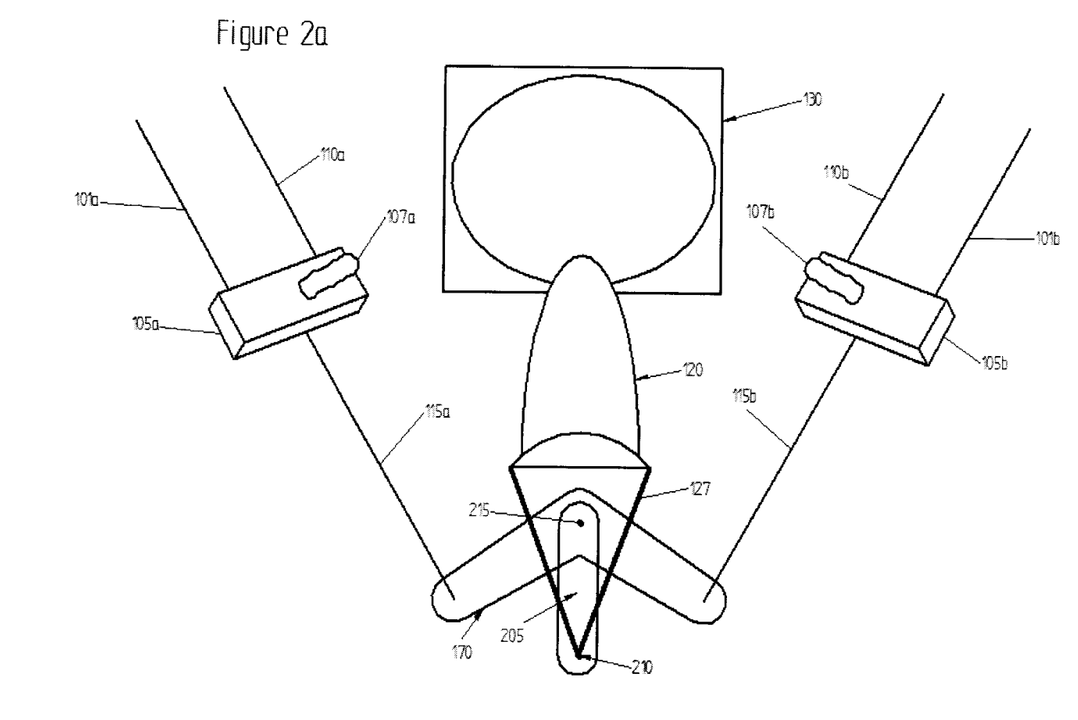
FIG. 2*a* is a partial rear view of one embodiment, showing a game chair, a video monitor and a partial view of the mechanism used to perform left and right motion.

FIG. 2a shows a partial view from the rear of the embodiment 100 showing the sway bar 170 connected to the rocker frame 145 (see FIG. 1a) by a left lower support wire 115a and a right lower support wire 115b. The sway bar 170 in this embodiment is a rigid, upside-down v-shaped structure that rotates about the sway bar support 205 at the support pivot 215. The sway bar support 205, in turn, comprises a rigid member flexibly coupled to the carriage 125 at support pivot 210. Taken together, pivot 215 and pivot 210 allow the carriage 125 to move left-right, forward-backward, and twist relative to the sway bar 170 during game-play.

Figure 2B:
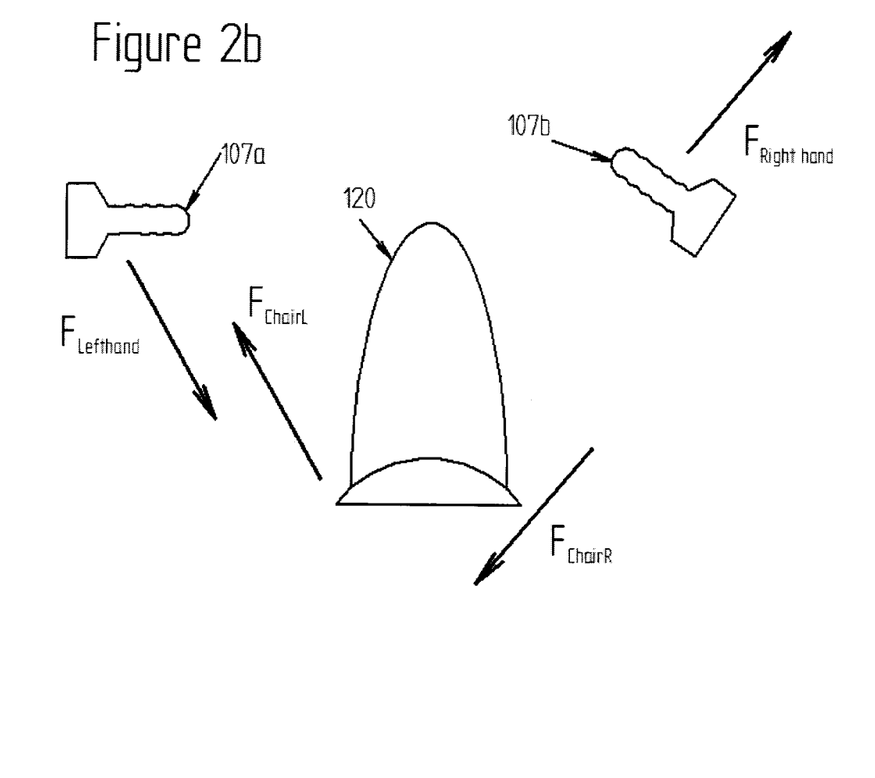
FIG. 2*b* depicts the forces that occur during a left turn.

FIG. 2b illustrates the forces occurring during an example left turn in more detail. The downward force of the user's left arm against the left handle 107a pulls the game chair 120 upward and to the left, thereby tilting the game chair 120 in a clockwise direction. The upward force of the user's right arm against the right handle 107b simultaneously pushes the game chair 120 down and to the left, while also tilting it in the clockwise direction. Advantageously, the user's and chair's 120 movement leftward and upward is resisted by the user's body weight, which allows the exercise level to scale naturally with the user's size. That is, as the game chair 120 moves upward and to the left, the sway bar 170 forces an increase in elevation. This change in elevation both creates resistance to the movement of the carriage 125, and returns the user and carriage 125 to the center position when the user removes the applied forces.

Figure 3:
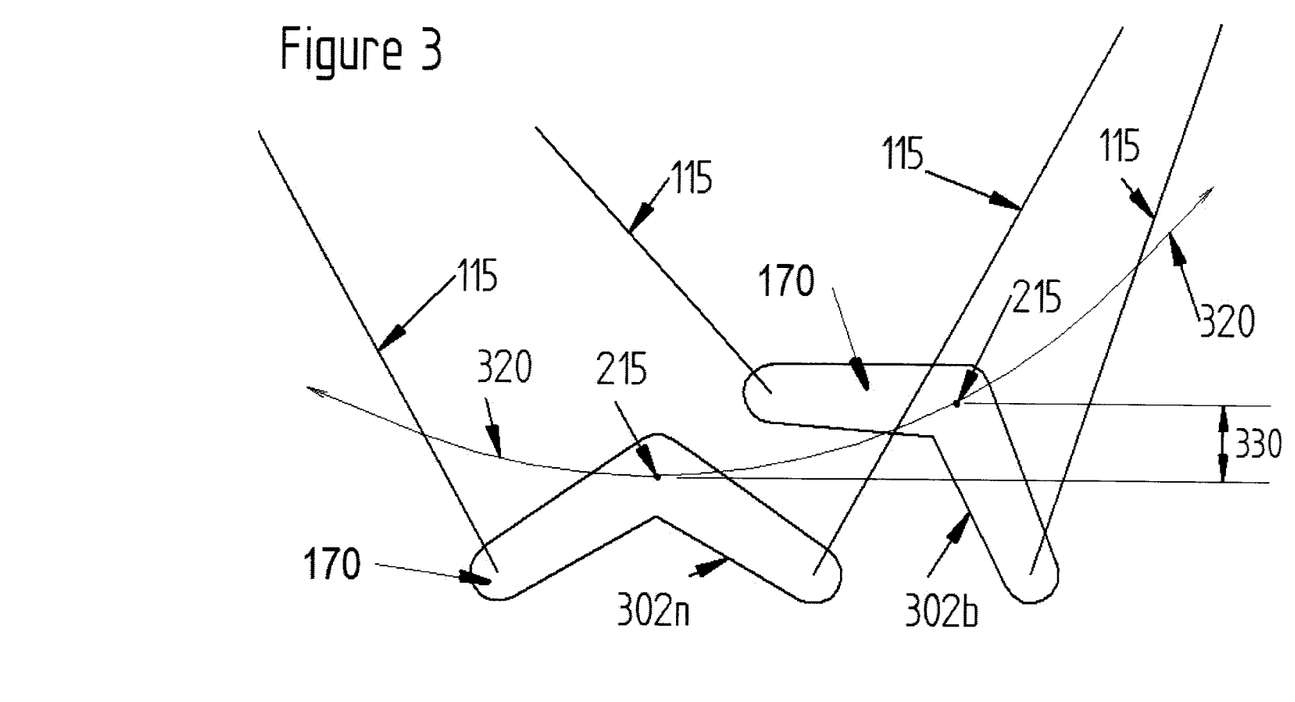
FIG. 3 is a rear view of a sway bar in two different positions: a center/neutral position and a right/elevated position (i.e., the position in which simulates a left turn in game).

FIG. 3 depicts the sway bar 170 in operation during a right turn command, as the sway bar 170 moves between a center/neutral position 302n and a biased/turning position 302b. The path arrow 320 in FIG. 3 depicts the path of the center pivot point 305 of the sway bar 170 during operation. A change in elevation 330 over the course of path 320 both creates resistance to side movement and returns the user's chair 120 to the center position when the user removes the applied force.

The sway bar 170 in this embodiment 100 is desirable because it allows for control of the curvature of path 320. That is, the sway bar 170 controls the path and elevation of the carriage 125 during left and right game control motion. As the user moves left or right by pushing and pulling against the hand controllers 107, the sway bar 170 takes up the slack from one side and delivers this slack to the opposite side, thereby controlling the amount elevation of the carriage 125 for a given horizontal motion. In this way, the sway bar 170 controls the change in elevation of the chair 120 relative to its horizontal motion, which in turn, allows control of the amount of resistance, relative to their body weight, that the user will need to exert to perform left and right turns.

While the upside down v-shaped sway bar 170 is desirable to provide the balance between resistance and motion, other sway bar shapes are within the scope and spirit of the invention. For example, the sway bar could constitute a circular member eccentrically mounted to the frame or a rectangular board. Similarly, some embodiments may replace or supplement the sway bar with weight plates and/or elastic bands to increase the resistance to movement and/or control the power curve experienced by the user.

Figure 4A:
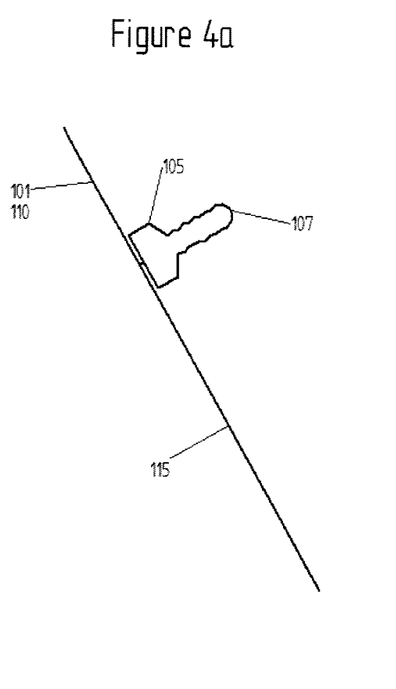
FIGS. 4*a*-4*c* are rear views of a hand controller in three different game control orientations (straight, left and right).
Figure 4B:
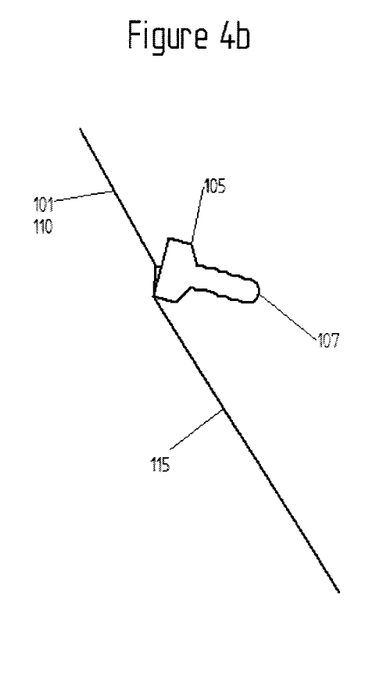
Figure 4C:
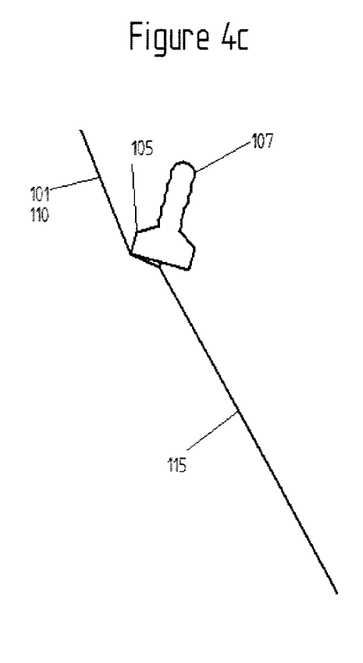

FIGS. 4a, 4b, and 4c show a rear view of the left hand controller 107 in its neutral, left turn, right turn positions, respectively. The right side is a mirror image of the left. As shown in these figures, the angle between the coupler 105 and the lower support wire 115 changes as the user pushes or pulls on the hand controller. A potentiometer (not shown) integrated into the left and right controllers 107 at the point in which the hand controller 107 meets the lower support wire 115 measures the change in this angle and sends corresponding input signals to a gaming console (not shown). These signals are used to control left and right movement of the user's avatar in-game. In other embodiments, the sensor measures the angle(s) between the U-joint pivot 140 and the hinge pivot 142, which may be desirable because these measurements, when combined by software, could define where the user is in space and how fast they are moving. In still other embodiments, the sensor measures the angle between the coupler 105 and lower support wire 115, or could use the Kinect system from Microsoft to directly measure the location of the carriage 125 user in the apparatus 100. The carriage movement could be directly used as input into the gaming console 132, thus more closely matching the simulated forces felt as the user sits in the chair 120 and movement of the user's avatar in-game.

As also shown in FIGS. 4a-4c, when the user pushes or pulls on the hand controllers 107, the resulting forces will bend the support wires 101, 110, 115. This bending allows the apparatus 100 to provide quick control input into the video game, while more gradually moving the carriage 125. That is, when the user pushes and pulls on the hand controllers 107, the bends the support cables. This bending stores some energy. This stored potential energy, in turn, allows the response time of the carriage 125 to be delayed slightly relative to the game related signals. In addition, the stored energy is desirable the user can let go of the hand controllers 107 and the tension in the support wires will quickly move the controls back to the neutral/straight position shown in FIG. 4a.

One embodiment 100 bends a 1.5 inch section of the support wires 101, 110, 115. A larger bending section would increase the force needed to move the hand controllers 107 and send input to the video. It would also increase the amount of carriage 125 movement. These changes are within the scope and spirit of the invention.

For some video games, the user may need some specialized controls, such as buttons, triggers, throttles, and the like. These controls can be integrated into the hand controllers 107, mounted in front of the user near the video monitor 130, or in some other convenient location. Unlike the hand controllers 107 described above, these supplemental controls may not be resisted by the user's weight and can thus be activated with minimal force.

Forward and Backward Motion

Figure 5A:
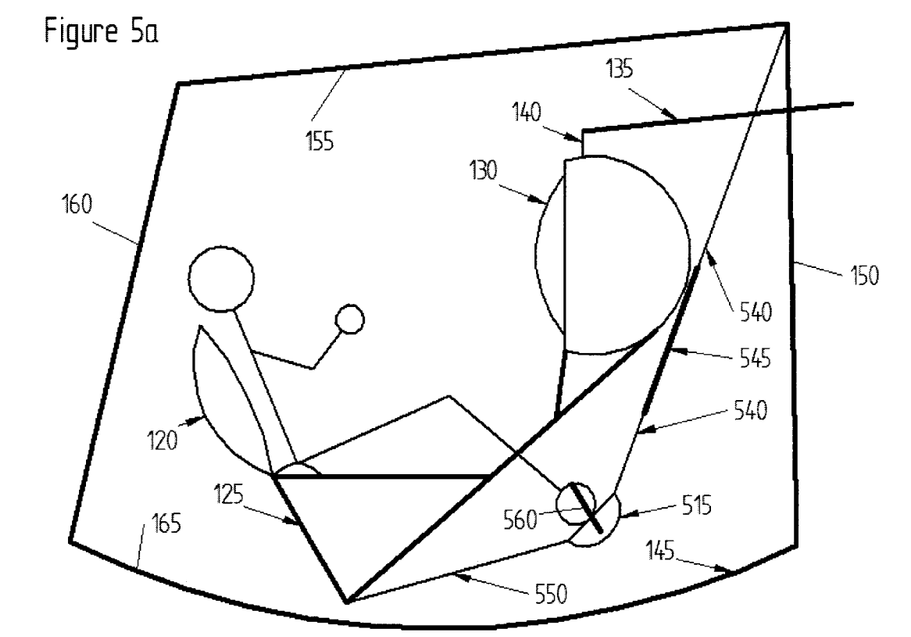
FIG. 5*a* is partial side view of an embodiment in a move backward (neutral) command position.
Figure 5B:
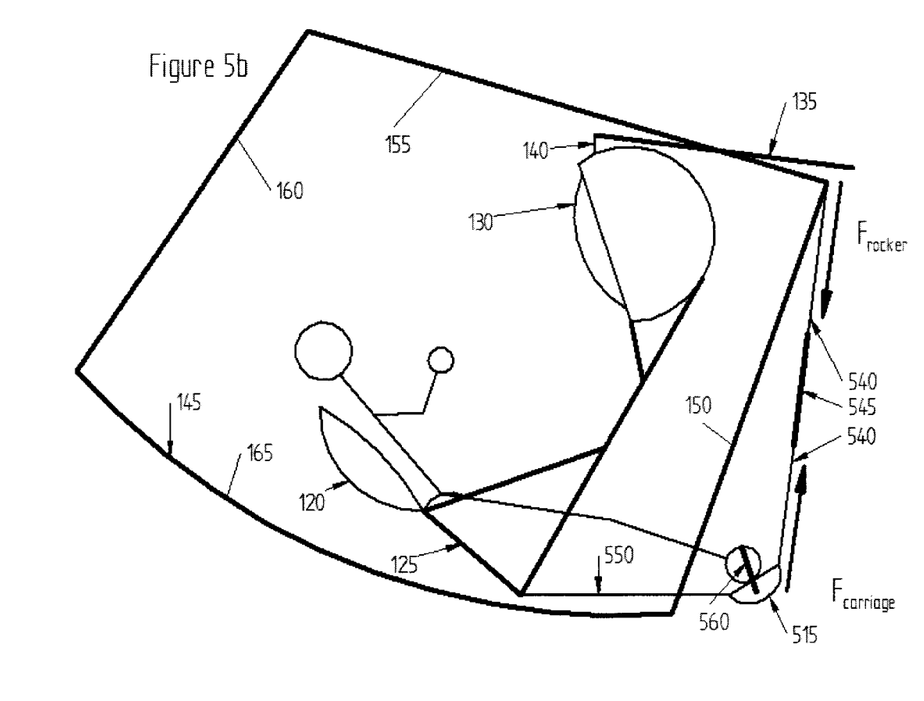
FIG. 5*b* is a partial side view of an embodiment in a move forward command position.

FIGS. 5a and 5b are partial views of a right side of one video game controller and exercise apparatus embodiment 100, with the arm controls and support wires removed for clarity. FIGS. 5a and 5b include the carriage 125, the front rocker frame member 150, the rear rocker frame member 160, the upper rocker frame member 155, the bottom rocker frame member 165, and a footpad 515. The footpad 515 is rotatably coupled to the carriage 125 by a carriage connector 550 and coupled to the rocker frame 145 by an elastic rocker band 545. The footpad 515 also includes foot straps 560 in this embodiment. FIG. 5b also labels the force on the rocker frame 145 and the force on the carriage 125 produced by the rocker band 545.

In operation, the user controls forward and backward movement by extension and flexion (i.e., contracting) of their legs, specifically, by pulling against the footpad straps 560 to generate a reverse command and pushing their legs against the footpad 515 to generate a forward command. These motions expand and contract the rocker band 545 and change its angle relative to the front rocker frame member 150. FIG. 5a illustrates the apparatus 100 when the user is performing the move backward command. The user begins by performing a crunch and/or bringing the knee in toward the stomach. This motion reduces the tension in the elastic rocker bands 545 and increases the angle between the rocker band 545 and the front rocker frame member 150. This change in force and angle, in turn, pitches the rocker frame 145 backward, in a counter-clockwise direction, and pitches the carriage 125 forward, in a clockwise direction. FIG. 5b shows a side view of the apparatus 100 when the user is performing a 'move forward' command. The user begins by extending their legs outward. This motion increases the tension in the elastic rocker bands 545 and decreases the angle between the rocker band 545 and the front rocker frame member 150. This change in force and angle, in turn, pitches the rocker frame 145 forward, in a clockwise direction, and pitches the carriage 125 backward, in a counterclockwise direction.

In one embodiment, the upper rocker frame member 155 is about 5.5 feet above the bottom rocker frame member 165 and the bottom rocker frame member 165 has an approximate 7 foot radius of curvature. These dimensions can produce desirable force and response characteristics. However, altering the mounting height of the support wires 101, 110 and 115 changing the radius of curvature of the rocker bottom 165 may be desirable to change the amount of carriage 125 movement or to change the amount of resistance the user experiences and are within the scope and spirit of the invention. Similarly, changes to the elastic strength of the rocker band 545 can alter the force and response characteristics and are within the scope and spirit of the invention.

In this embodiment 100, forward/reverse game control signals are generated by a potentiometer located at the point at which the carriage connector 550 meets the carriage 125 and that measures the angle of the carriage connector 550 with respect to the carriage 125. As shown by comparing FIGS. 5a and 5b, this angle changes as the user flexes and extends their legs against the footpad 515.

In the embodiment in FIGS. 5a and 5b, the user must both actively move their legs to initiate movement, and actively resist the resulting momentum at the end of the movement. This dual action is desirable because it can provide an enhanced workout. However, other embodiments are within the scope and spirit of the present invention. For example, in some embodiments, the rocker frame 145 may be made shorter and shock absorbers added to each ends. These embodiments may be desirable because they allow the device to be physically smaller, and may allow the user to make more violent movements. In addition, the bottom rocker frame member 165 may be formed into various shapes in some embodiments, which can allow tailoring of the force/response curve. The spring coefficient of the elastic rocker bands 545 could be increased, which will allow more forward movement as the user moves the footpad.

Some embodiments of the present invention offer numerous advantages over conventional game controllers. For example, during normal video game play, the user may need to make some fast and precise movements. Therefore, the controls of the video game in this embodiment 100 are not directly connected to the position of the carriage 125. Instead, the sensors are built into the hand controller 107 and footpad 515, and activation merely alters the balance of the embodiment. In this way, the response time (lag) in game control is much less than the response time (lag) of the carriage 125.

While the present invention has been particularly described in conjunction with a preferred embodiment, it is evident that many alternatives, modifications and variations will be apparent to those skilled in the art in light of the foregoing description. For example, some embodiments may add attach a motor with an offset mass to the carriage 125 to provide vibrating/haptic feedback in response to in-game events, such as when the user's avatar is being attacked. Other embodiments may include next generation haptic actuator technologies, such as electro-active polymers, piezoelectric actuators, and electrostatic surface actuators. Still other embodiments vary the resistance required to move the carriage 125 in response to in-game events, such as when the user's avatar is going up or down hill. One such embodiment varies the resistance using compressed air (pneumatics) mounted between the carriage 125 and the rocker frame 145. Moreover, those skilled in the art will appreciate that any particular nomenclature used in this description was merely for convenience, and thus the invention should not be limited to use solely in any specific application or orientation identified and/or implied by such nomenclature. It is therefore contemplated that the appended claims will embrace any such alternatives, modifications and variations as falling within the true scope and spirit of the present invention.

I claim:

1. An exercise apparatus, comprising:
   a support cable having a first end and a second end;
   a game chair suspended from a frame by the support cable at the first end;
   a first handle coupled to the support cable between the first end and the second end within reach of the suspended game chair; and
   a first sensor that generates game input signals related to an angle between the first handle and the support cable when a user applies force to move the game chair from a neutral position using the first handle.

2. The exercise apparatus of claim 1, further comprising a plurality of support cables that suspend the game chair from the frame at a first height from a reference surface, and wherein the user applies force to move the game chair to a second height from the reference surface.

3. The exercise apparatus of claim 2, further comprising a sway bar coupled to the game chair and the plurality of support cables, wherein the sway bar controls motion of the game chair between the first height and the second height relative to the reference surface when the user applies force to move the game chair away from the first handle.

4. The exercise apparatus of claim 2, wherein the user's weight resists the movement of the game chair between the first height and the second height above the reference surface.

5. The exercise apparatus of claim 2, wherein the first handle is coupled to a first of the plurality of cables; and further comprising a second handle coupled to a second of the plurality of support cables within arm-reach of the suspended video game chair, opposite the first handle.

6. The exercise apparatus of claim 5, further comprising a second sensor that generates additional game related data when the user biases the game chair away from the second handle.

7. The exercise apparatus of claim 1, further comprising:
   a rocker coupled to a bottom surface of the frame; and
   a footpad coupled to the frame within leg-reach of the game chair, the footpad adapted to rotate the frame from a neutral position along the rocker.

8. The exercise apparatus of claim 7, further comprising a display coupled to the frame adjacent to the game chair.

9. The exercise apparatus of claim 1, further comprising:
   a video display; and
   a game console electrically coupled to the first sensor and the video display, wherein the game console generates video signals for display on the video display in response to the game related signals from the first sensor.

10. A method of controlling a video game, comprising:
  applying a first force against a first handle, wherein the first force rotates a game chair suspended from a frame by support cables away from the first handle around a roll axis, the first handle having an integrated sensor that generates first game related data related to the first force against the first handle; and
  applying a second force against a foot rest, wherein the second force rotates the suspended video game chair away from the foot rest around a pitch axis, and wherein the pitching generates second game related data related to the second force against the foot rest.

11. The method of claim 10, wherein a response time of the integrated sensor to the first force is less than a response time of the suspended video game chair to the first force.

12. The method of claim 10, further comprising rolling the suspended video game chair along a frame roller member.

\* \* \* \* \*